United States Patent [19]

Fransson

[11] 4,319,909

[45] Mar. 16, 1982

[54] GLASS MELT TANKS

[76] Inventor: Arne S. B. Fransson, Diamantstigen 8, Emmaboda S-361 00, Sweden

[21] Appl. No.: 29,342

[22] PCT Filed: Aug. 8, 1978

[86] PCT No.: PCT/SE78/00027
§ 371 Date: Apr. 10, 1979
§ 102(e) Date: Apr. 10, 1979

[87] PCT Pub. No.: WO79/00090
PCT Pub. Date: Mar. 8, 1979

[30] Foreign Application Priority Data

Aug. 10, 1977 [SE] Sweden ............................ 7709047

[51] Int. Cl.³ .............................................. C03B 5/26
[52] U.S. Cl. ........................................ 65/331; 65/161; 65/164; 65/339; 65/347
[58] Field of Search ................ 65/160, 161, 331, 164, 65/339, 347

[56] References Cited

U.S. PATENT DOCUMENTS

| 1,307,527 | 6/1919 | Wadsworth | 65/339 X |
| 1,852,218 | 4/1932 | Peiler | 65/331 X |
| 3,476,538 | 11/1969 | Trethewey | 65/161 X |

FOREIGN PATENT DOCUMENTS

| 1141153 | 1/1969 | United Kingdom | 65/161 |
| 446477 | 2/1973 | U.S.S.R. | 65/161 |

*Primary Examiner*—Arthur D. Kellogg
*Attorney, Agent, or Firm*—Beveridge, DeGrandi & Kline

[57] ABSTRACT

An improved glass melt tank (10) having a feeder (15) and a channel (14) which interconnects the tank and the feeder and in which is arranged a rotary, raisable and lowerable regulator (20, 21) which opens and closes the channel (14) so that the feeder (15) is supplied with molten glass from the tank (10) when a level sensing means (22) senses a lower level in the feeder, the supply of molten glass being caused to cease when an upper level is sensed. The regulator (20, 21) rotates continuously in order not to get stuck in setting glass and seals against a horizontal seat formed in the channel.

4 Claims, 1 Drawing Figure

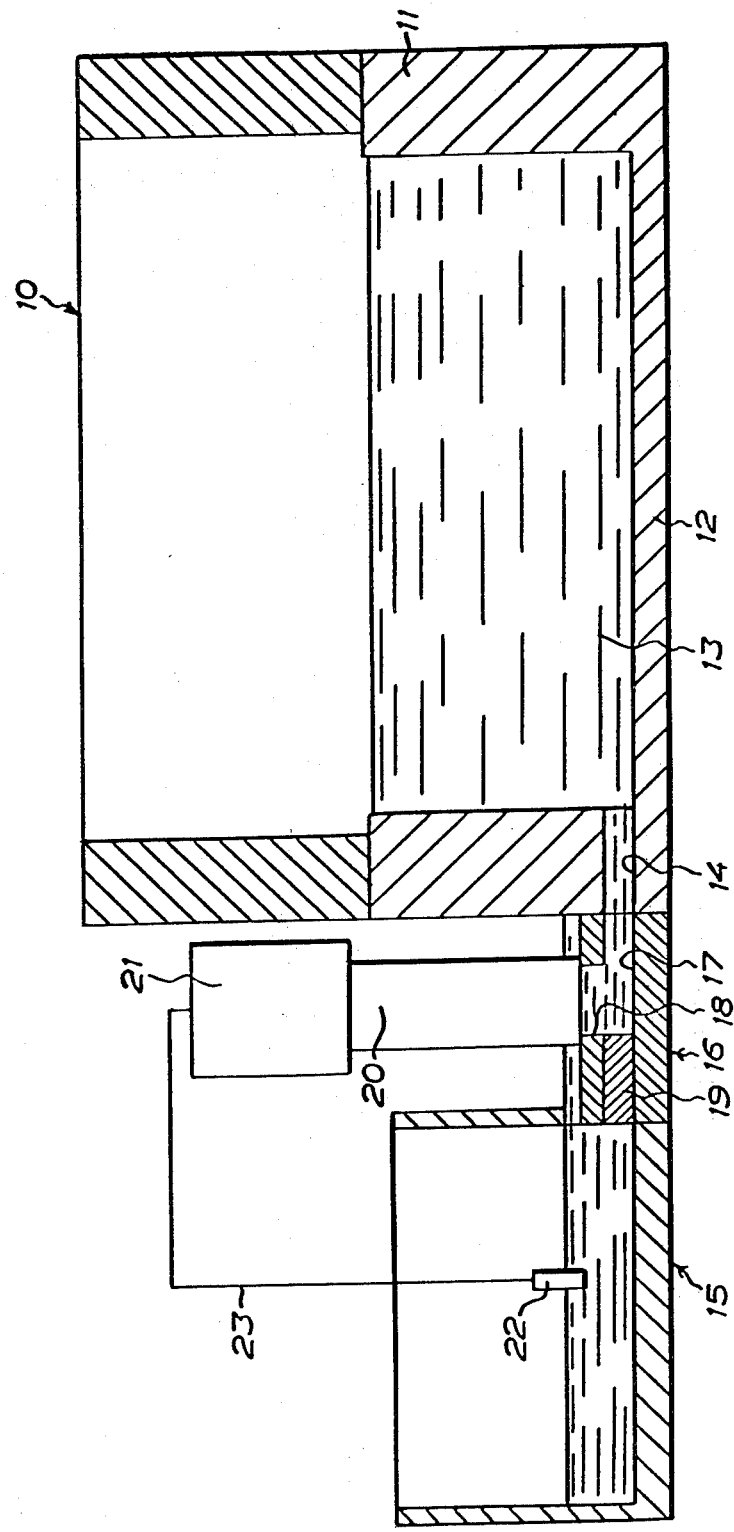

GLASS MELT TANKS

This invention relates to an improved glass melt tank.

In glass making use is made of furnaces or tanks for melting of the glass charge. These tanks fundamentally are of two different types, i.e. continuous tanks and day tanks. The raw material, the glass charge, is continuously supplied to and molten glass is continuously withdrawn from a continuous tank, and for this reason such a tank necessitates working in three shifts. Besides the amount of molten glass is considerable, normally corresponding approximately to the tapping made during four days. In a day tank so large an amount of raw material is molten at night as corresponds to the next day's tapping. The advantage associated with the continuous tank is that the surface of the melt is kept at a constant level, permitting the connection of a feeder through which moulds can be filled with the exactly correct amount of glass at the correct temperature. The disadvantages comprise working in three shifts, high initial costs and high energy consumption as well as a large amount of glass, which implies that glass for several day's production has to be discarded should ingredients be deficient or incorrect weighing have occurred. The day tank does not present the disadvantages of the continuous tank but suffers instead from the drawback that the surface of the melt in the tank varies between maximum level in the morning and minimum level in the evening. This drawback is of great importance since it does not allow the connection—like in the continuous tank—of a feeder and therefore necessitates manual handling of the glass. Such work is very hot and strenuous and frequently gives rise to industrial injuries.

The object of the present invention is to provide a day tank which is endowed with the advantages of the continuous tank with regard to constant feeding level, whereby manual handling of the glass is eliminated. This object is realised by means of a tank design comprising a feeder to which molten glass can be supplied through a channel which extends between the feeder and a lower portion of the tank, and a regulator in said channel, which by opening and closing of the channel regulates the level of the molten glass in the feeder.

With the aid of the regulator the glass level in the feeder can be readily regulated within narrow limits, particularly so if a level sensor senses the level of the molten glass in the feeder and actuates the regulator accordingly. Thus the glass moulds can be filled in the same manner as in a continuous tank. The regulator preferably consists of a continuously rotating, raisable and lowerable cylindrical member which engages a seat formed by a vertical part of the channel.

The invention will be described in greater detail hereinbelow with reference to the accompanying drawing which highly schematically illustrates a tank having a feeder in cross section.

The illustrated tank 10 is a conventional type tank having a wall 11 and a bottom 12 of a material resistant to molten glass. Raw material, glass batch, which is molten by means of a heating device (not shown) is supplied to the tank 10, the amount of molten glass 13 approximately corresponding to one day's production. A channel 14 is provided in the wall 11 of the tank 10 close to the bottom thereof, and molten glass 13 can flow out of the tank through said channel. A feeder 15 is placed close to the tank 10. It is likewise made of a material resistant to the molten glass and through said feeder moulds can be filled in the same way as through the feeder of a continuous tank. The feeder 15 further has an opening in its wall close to the bottom thereof. Said opening is connected to the channel 14 in the wall of the tank 10 by a connecting device 16 which is adapted to supply the feeder 15 with a controlled amount of molten glass from the tank 10.

Same as the tank 10 and the feeder 15 the connecting device 16 is made from a material resistant to molten glass and has an angularly bent channel with a horizontal branch 17, which is connected to the channel 14 of the tank, and a vertical branch 18, which opens into an upper horizontal channel. The material surrounding the upper end of the vertical branch 18 of the channel constitutes a seat for a valve member in the form of cylinder 20 which is continuously rotatable and raisable and lowerable by means of a drive 21. The upper horizontal channel of the connecting device 16 opens, as will appear from the drawing, into the feeder 15, and by raising and lowering the cylinder 20 the desired amount of molten glass can be supplied to the feeder 15 from the tank 10. The continuous rotation of the cylinder 20 will eliminate "freezing" of the cylinder 20 in the molten glass 13. The connecting device 16 and the vertically movable cylinder 20 determine the surface level of the molten glass in the feeder 15 and, as indicated at 19, the device 16 is preferably so designed that the vertical height of the seat and thus the glass level in the feeder 15 can be regulated.

To keep the glass level in the feeder 15 within narrow limits the feeder houses a level sensor 22 which via a line 23 is connected to a regulating means coupled to the drive 21 of the cylinder 20 so that said cylinder 20 is raised and lowered in response to the signals received from the sensor 22.

It will be realized from the above description that the invention provides a day tank which functions as a continuous tank but does not present the disadvantages thereof, resulting particularly in a considerably improved working environment.

I claim:

1. In a glass melt tank of the type provided with a feeder, the improvement comprising
    a channel connecting said feeder with a lower portion of said tank, through which molten glass can be supplied from said tank to said feeder,
    said channel having a horizontal branch connected to said tank and a vertical branch, said vertical branch having an upper end constituting a seat,
    a regulator in said channel engageable with said seat for opening and closing said channel to regulate the level of molten glass in said feeder, said regulator being a continuously rotatable, raisable and lowerable cylindrical member and a drive therefor, and a level sensing means in said feeder connected to said drive for the cylindrical member.

2. A tank as claimed in claim 1, characterised in that the height of the vertical branch of the channel is regulatable.

3. In a glass melt tank of the type provided with a feeder, the improvement comprising
    a channel connecting said feeder with a lower portion of said tank, through which molten glass can be supplied from said tank to said feeder,
    said channel having a horizontal branch connected to said tank and a vertical branch, said vertical branch having an upper end constituting a seat, a regulator in said channel engageable with said seat for opening and closing said channel to regulate the level of molten glass in said feeder, said regulator being a continuously rotatable, raisable and lowerable cylindrical member and a drive therefor.

4. A tank as claimed in claim 3, characterized in that the height of the vertical branch of the channel is regulatable.

* * * * *